(12) United States Patent
Cagle

(10) Patent No.: US 10,375,574 B2
(45) Date of Patent: *Aug. 6, 2019

(54) EMERGENCY CONTACT METHOD AND SYSTEM

(71) Applicant: Allen Cagle, Folsom, CA (US)

(72) Inventor: Allen Cagle, Folsom, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/150,089

(22) Filed: Oct. 2, 2018

(65) Prior Publication Data

US 2019/0037403 A1 Jan. 31, 2019

Related U.S. Application Data

(63) Continuation of application No. 14/990,739, filed on Jan. 7, 2016, now Pat. No. 10,129,752.

(60) Provisional application No. 62/101,274, filed on Jan. 8, 2015.

(51) Int. Cl.
*H04W 12/08* (2009.01)
*H04L 29/06* (2006.01)
*H04W 4/90* (2018.01)
*H04W 4/80* (2018.01)

(52) U.S. Cl.
CPC .......... *H04W 12/08* (2013.01); *H04L 63/105* (2013.01); *H04W 4/80* (2018.02); *H04W 4/90* (2018.02)

(58) Field of Classification Search
CPC ....... H04W 12/08; H04W 4/008; H04W 4/22; H04B 5/0031
See application file for complete search history.

(56) References Cited

U.S. PATENT DOCUMENTS

| | | | |
|---|---|---|---|
| 7,466,235 B1 * | 12/2008 | Kolb | G16H 10/65 340/573.1 |
| 2009/0205041 A1 | 8/2009 | Michalske | |
| 2010/0023528 A1 * | 1/2010 | Cion | G16H 10/65 707/E17.01 |
| 2010/0102123 A1 * | 4/2010 | Skowronek | G06Q 20/20 235/380 |
| 2010/0190467 A1 | 7/2010 | Scott et al. | |
| 2013/0012155 A1 * | 1/2013 | Forstall | H04M 3/42365 455/404.2 |
| 2013/0068837 A1 | 3/2013 | Dollard | |
| 2013/0225118 A1 * | 8/2013 | Jang | H04W 4/90 455/404.2 |
| 2013/0295872 A1 * | 11/2013 | Guday | H04W 4/90 455/404.1 |
| 2013/0317835 A1 | 11/2013 | Mathew | |
| 2014/0282877 A1 * | 9/2014 | Mahaffey | H04L 63/0853 726/3 |

(Continued)

FOREIGN PATENT DOCUMENTS

WO 2007/092429 A2 8/2007
WO WO-2007092429 A2 * 8/2007 ............ G06F 21/34

*Primary Examiner* — Kathy W Wang-Hurst
*Assistant Examiner* — Minjung Kim
(74) *Attorney, Agent, or Firm* — Haverstock & Owens LLP

(57) ABSTRACT

An emergency contact method and system to enable a person to access emergency contact information without unlocking a user's mobile device is described herein. The emergency contact information is able to be input by a user or automatically generated and then displayed to another user without requiring the other user to know the personal security code of the mobile device.

19 Claims, 3 Drawing Sheets

(56) References Cited

U.S. PATENT DOCUMENTS

2015/0172238 A1* 6/2015 Ahmed .................. H04L 51/08
                                                  709/217
2015/0245189 A1* 8/2015 Nalluri ................. G06Q 50/265
                                                  455/404.1
2017/0150038 A1   5/2017 Papkipos et al.

* cited by examiner

In Case of Emergency

100

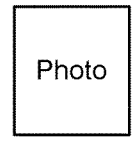 (Optional)

My Name is: _____

My Address: (Optional) _____
_____

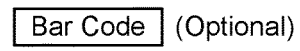 (Optional)

My Emergency Contact  1: (Name)  (Phone Number)
2: (Name)  (Phone Number)
3: (Name)  (Phone Number)

My Medical ID Number (Optional): _____

My Meds: (Optional) _____

My Condition: (Optional) _____    Healthy ☐        Deaf ☐
Good ☐           Blind ☐
My Allergies: (Optional)  [ select ▼ ]         Poor ☐           HIV ☐
Heart ☐          Diabetes ☐
Disease
Emergency Comments: (Optional)              Epilipsy ☐       High BP ☐

Fig. 1

In Case of Emergency

200

My Name is:     Bob Taylor

My Address: (Optional)    123 Main St.
                               San Francisco, CA 94117

My Emergency Contact    1: Jen    (415-111-1111)
                               2: Steve Jackson    (415-111-1234)
                               3: Bro    (415-111-5678)

My Medical ID Number (Optional):    12345

My Meds: Cardura

My Condition: Heart Attack in 2011.

My Allergies: (None)

Emergency Comments:

I have signed an Advanced Healthcare Directive. My wife and doctor (Dr. Bill) have a copy.

EMERGENCY CONTACT METHOD AND SYSTEM

CROSS-REFERENCE TO RELATED APPLICATION(S)

This application is a continuation application of co-pending U.S. patent application Ser. No. 14/990,739, filed Jan. 7, 2016, titled "EMERGENCY CONTACT METHOD AND SYSTEM," which claims priority under 35 U.S.C. § 119(e) of the U.S. Provisional Patent Application Ser. No. 62/101,274, filed Jan. 8, 2015 and titled, "EMERGENCY CONTACT METHOD AND SYSTEM," which are both hereby incorporated by reference in their entirety for all purposes.

FIELD OF THE INVENTION

The present invention relates to the field of mobile devices. More specifically, the present invention relates to displaying emergency contact information using a mobile device.

BACKGROUND OF THE INVENTION

If a person becomes incapacitated, such as after a car accident or a medical incident, medical personnel treating the person would like to be able to communicate with emergency contacts of the incapacitated person. However, if the person's mobile device is locked, it may be difficult for the medical personnel to locate the emergency contact information.

SUMMARY OF THE INVENTION

An emergency contact method and system to enable a person to access emergency contact information without unlocking a user's mobile device is described herein. The emergency contact information is able to be input by a user or automatically generated and then displayed to another user without requiring the other user to unlock the mobile device or to know the personal security code of the mobile device.

In one aspect, a method programmed in a non-transitory memory of a device comprises receiving emergency contact information and displaying the emergency contact information on the device without unlocking the device. The emergency contact information includes at least one of a name of an owner of the device, an address, a photograph, a scannable item, an emergency contact information, a medical identification number, current medications of the owner of the device, and current health conditions of the owner of the device. Receiving the emergency contact information includes automatically populating fields on the device by retrieving the information from a second device or from a social networking site. Receiving the emergency contact information includes acquiring an image of an owner of the device by selecting a photo box on the device which causes a camera of the device to be triggered to enable the owner to take a picture of himself/herself which is displayed in the photobox. Receiving the emergency contact information includes receiving a phone number and retrieving corresponding information based on the phone number. Displaying the emergency contact information includes scanning a code with a second device which causes the second device to send a signal to unlock the device which displays the emergency contact information. Displaying the emergency contact information includes detecting finger pressure and movement on a screen of the device before displaying the emergency contact information. Displaying the emergency contact information includes using a camera of the device to read a code on an item to determine if a person is granted access to the emergency contact information. Displaying the emergency contact information occurs after a physical device containing emergency credentials provided only to a select group of people is inserted into the device. The method further comprises automatically contacting an emergency contact using the emergency contact information, and contacting one or more additional emergency contacts using the emergency contact information in sequential order if a prior call does not result in an answered call. The method further comprises editing the emergency contact information by detecting deletion of a contact from the device and communicating with a medical database to determine changes in medical condition of an owner of the device. The method further comprises implementing a security measure to ensure the emergency contact information is only accessed by emergency or medical personnel.

In another aspect, an apparatus comprises a non-transitory memory for storing an application, the application for: receiving emergency contact information and displaying the emergency contact information on the apparatus without unlocking the apparatus and a processing component coupled to the memory, the processing component configured for processing the application. Displaying the emergency contact information includes scanning a code with a second device which causes the second device to send a signal to unlock the apparatus which displays the emergency contact information. Displaying the emergency contact information includes using a camera of the apparatus to read a code on an item to determine if a person is granted access to the emergency contact information. Displaying the emergency contact information occurs after a physical device containing emergency credentials provided only to a select group of people is inserted into the device. The application is further for automatically contacting an emergency contact using the emergency contact information, and contacting one or more additional emergency contacts using the emergency contact information in sequential order if a prior call does not result in an answered call. The application is further for implementing a security measure to ensure the emergency contact information is only accessed by emergency or medical personnel.

In another aspect, a method programmed in a non-transitory memory of a device comprises accessing emergency contact information and displaying the emergency contact information on the device without unlocking the device. Accessing the emergency contact information includes authorizing a user. Authorizing the user includes: using a camera of the device to read a code on an item to determine if a person is granted access to the emergency contact information, using RFID to determine if the person is granted access to the emergency contact information, using NFC to determine if the person is granted access to the emergency contact information, or using a wireless technology to determine if the person is granted access to the emergency contact information. Authorizing the user includes sending an unlock signal from a second device to the device which unlocks the emergency contact information. The unlock signal is sent from the second device to the device using an application on the second device which is accessible only by medical or emergency personnel.

BRIEF DESCRIPTION OF THE DRAWINGS

FIG. 1 illustrates an exemplary input screen for inputting the emergency contact information according to some embodiments.

DETAILED DESCRIPTION OF THE PREFERRED EMBODIMENT

Figure 2:
FIG. 2 illustrates an exemplary display of the emergency contact information according to some embodiments.

The emergency contact method and system is able to be used for first responders in case the owner of the mobile device (e.g., smart phone) is unable to communicate or for lost and found purposes. In some embodiments, the emergency contact method and system is implemented as an application ("app") on the mobile device and is accessible via an icon (e.g., a red capital E or a capital E in the same color as the text of the device) placed in the top right corner of the phone, next to the battery and the signal bar indicators. Accessing the emergency contact app is able to be performed in any manner, and the icon for the app is able to appear in any manner and is able to be located anywhere on the screen or device. In some embodiments, the emergency contact information is accessible by scrolling down on the face of the mobile device before the lock screen (e.g., before unlocking the device with a personal access code or biometric input). This will assist emergency first responders or other medical personnel to find out who the person is and/or if there are any special needs or cautions, as well as emergency contact information. The emergency contact app is able to be implemented on any type of device such as touch screen phones. In some embodiments, the emergency contact app is a standalone app, and in some embodiments, the app is included with all new phones as part of the operating system. The emergency contact app is able to be utilized with an Android®, iPhone® or any other type of phone.

The emergency contact information is able to include any kind of information and is able to be displayed in any format. For example, the emergency contact information includes: the phone owner's name, address, photo, a scannable item (e.g., bar code, QR code), one or more emergency contacts' names and phone numbers, a medical identification number, current medications of the phone owner, current health conditions of the phone owner (e.g., diabetes, deaf, epilepsy, HIV, heart condition), allergies (e.g., food, medicine), and/or emergency comments. In some embodiments, one or more of these fields are optional, and in some embodiments, one or more of the fields are required. In some embodiments, the fields are able to be filled out by the new owner of the phone upon purchase or at another time. In some embodiments, the fields are automatically populated, for example, by retrieving the information from a previous device, retrieving the information from a database (e.g., a dedicated database in the cloud), retrieving the information from a social networking site (e.g., Facebook®) or any other manner.

FIG. 1 illustrates an exemplary input screen for inputting the emergency contact information according to some embodiments. The input screen 100 enables a user to input any personal information such as name, address, emergency contact information, medical identification number, medications, conditions, allergies, and/or additional comments. The input screen 100 allows a user to input the information using a touchscreen or any other input implementation. The input screen 100 is able to utilize text boxes, check boxes, radio buttons, menus, and/or any other input/selection implementation to receive data from a user. In some embodiments, the input screen 100 includes automatically populated information such as information retrieved from a database or another source. The input screen 100 is able to be implemented using voice input or any other input implementation. Additionally, a photo/image and/or a scannable item are able to be included. For example, the user is able to select the photo box, which causes a popup to display the images stored/accessible by the device (e.g., photo gallery, cloud photo gallery). In another example, selecting the photo box causes the phone's camera to be triggered to enable the user to take a photo of himself which will be displayed in the photo box. The scannable item (or readable item) is able to be any item such as a bar code, a QR code, or another item that is able to be utilized by someone else (e.g., medical personnel) to obtain information about the phone owner/user. Furthering the example, a medical personnel carries a smart phone with a bar code reader app, and when the medical personnel scans the bar code on the emergency page of the user's mobile device, the medical information (and/or other information) of the user is displayed on the medical personnel's smart phone. In some embodiments, scanning the item causes the medical personnel's smart phone to send a special signal to unlock the user's device which displays or enables the display of the medical information (and/or other information) of the user on the user's device. In some embodiments, the only items displayed are the bar code and/or the photo for added protection, but with the ability of the appropriate personnel to unlock the hidden information (e.g., medical information). The scannable item is able to be added to the emergency contact information in any manner such as by a user visiting a website to generate a bar code or QR code and dragging and dropping the generated code in the appropriate space on the emergency page. In another example, the user selects (e.g., presses on the touchscreen of the device) the box of the code, and a prompt appears asking if the user would like to generate a code to display with the emergency information. The code is generated by an app on the phone or in the cloud and then displayed.

FIG. 2 illustrates an exemplary display of the emergency contact information according to some embodiments. The display of the emergency contact information 200 is able to include any information input, retrieved and/or stored about the owner of the mobile device. Although the emergency contact information 200 displayed in FIG. 2 shows a specific display format, any format of the information is possible. Additionally, any color scheme or any other stylized components are able to be utilized. For example, the information is able to be displayed on a white back ground and black letters with no graphics or colors. In some embodiments, more or less information is displayed, and/or the order of the information is modified.

Figure 3:
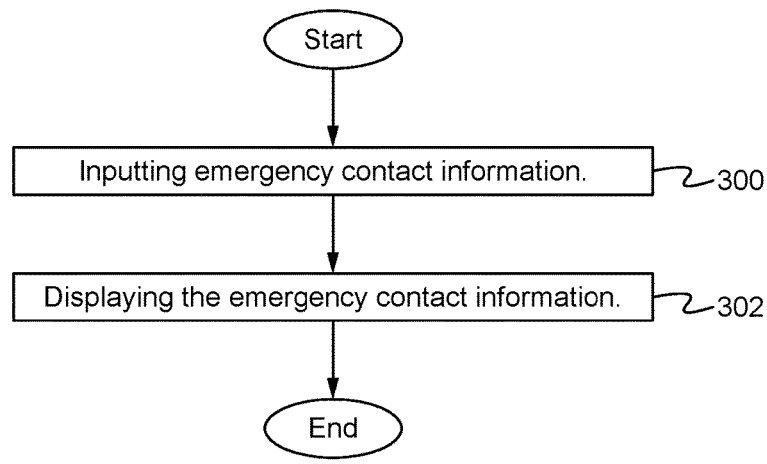
FIG. 3 illustrates a flowchart of a method of implementing the emergency contact system according to some embodiments.

FIG. 3 illustrates a flowchart of a method of implementing the emergency contact system according to some embodiments. In the step 300, emergency contact information is input/retrieved/stored. The information is able to be input manually using the input screen of FIG. 1. The information is able to be input automatically, for example, by retrieving the information from another device (e.g., old smart phone or sharing via a device "bump"). As described herein, the information is able to be retrieved in any manner from any data source such as a cloud device, another user device, a medical device/system and/or any other device. In some embodiments, some information is manually input, and some information is automatically input. For example, the user inputs his name or phone number, and then relevant information is automatically retrieved. In some embodiments, the emergency contact information is updated based on changes detected. For example, if it is detected that a contact is deleted from a user's phone, and the contact is one of the emergency contacts, the user is prompted or asked if they want to change their emergency contact information. In another example, the mobile device communicates with a medical/doctor database, and if a medical condition changes (e.g., doctor makes a new diagnosis), then the medical conditions in the emergency contact information are updated. Similarly, a pharmacy database is able to communicate current medications of the user, including any changes.

In the step 302, the emergency contact information is displayed on the device. In some embodiments, the information is displayed after a user (e.g., medical personnel) swipes down on the device display. For example, the device detects finger pressure and/or movement on the screen. In some embodiments, the information is displayed after a user swipes down on the device display and then selects an emergency contact icon. Any other actions, motions, voice-commands, and/or inputs are able to be implemented to display the emergency contact information. The emergency contact information is able to be displayed before unlocking the device. More specifically, the emergency contact information is able to be displayed without inputting the user's personal unlock code or biometric information. In some embodiments, in addition to/or instead of displaying the emergency contact information, the first contact in the emergency contact list is automatically called and the phone number is hidden. For example, a medical personnel swipes down on the screen and taps the emergency contact icon which automatically dials an emergency contact phone number. In some embodiments, the emergency contacts are called sequentially in order if the previous call results in a hangup before a pickup. For example, if the call to emergency contact #1 results in a hangup before the contact answers the phone, then emergency contact #2 is automatically called. In some embodiments, the automatic calling of emergency contacts does not occur until one or more of the additional security steps described herein occur.

In some embodiments, the emergency contact information is displayed upon detecting an authorized user (e.g., medical personnel). For example, the mobile device's camera is able to be activated while the device is still locked to enable reading a bar code on a nurse's badge. In another example, Radio Frequency Identification (RFID), Near-Field Communication (NFC), Bluetooth, infrared, and/or any other wireless or wired implementation is able to be used to determine whether the person attempting to access the emergency contact information should have access. For example, using NFC, the user's mobile device communicates with a hospital device (e.g., the mobile device receives an unlock signal from the hospital device) which unlocks the emergency contact information, so that the information is accessible only to those at the hospital. Similarly, a smart phone of medical personnel is able to transmit a special unlock signal that when positioned near a mobile device unlocks the emergency contact information. In another example, the mobile device is able to communicate with or detect a special app on a smart phone (or other device) of a medical personnel, and the app used by the medical personal grants access to the emergency contact information (e.g., the app is password protected, and the password is controlled by a medical/emergency agency). In yet another example, a physical device is able to be inserted into a mobile device port (e.g., the battery charging port, a USB port, or any other port), which provides access to the emergency contact information. Furthering the examples, the special app or the physical device (e.g., key) is able to be provided to a nurses, doctors, police, fire, and/or other emergency units, so that only the appropriate people have these specialized keys or apps to view emergency contact information. These security measures are able to be implemented to provide additional protection in case a user's mobile device is stolen but still grant access to those who may need it to help. In some embodiments, fewer or additional steps are implemented.

Figure 4:
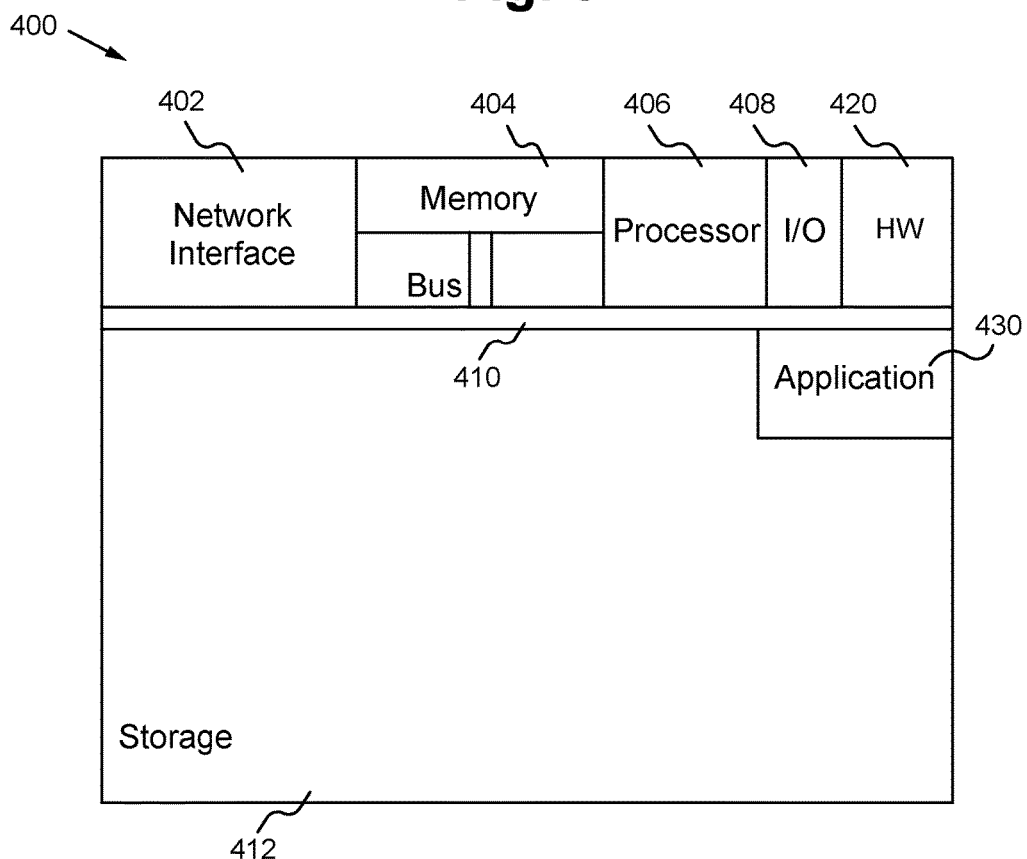
FIG. 4 illustrates a block diagram of an exemplary computing device configured to implement the emergency contact method according to some embodiments.

FIG. 4 illustrates a block diagram of an exemplary computing device configured to implement the emergency contact method according to some embodiments. The computing device 400 is able to be used to acquire, store, compute, process, communicate and/or display information such as images and videos. In general, a hardware structure suitable for implementing the computing device 400 includes a network interface 402, a memory 404, a processor 406, I/O device(s) 408, a bus 410 and a storage device 412. The choice of processor is not critical as long as a suitable processor with sufficient speed is chosen. The memory 404 is able to be any conventional computer memory known in the art. The storage device 412 is able to include a hard drive, CDROM, CDRW, DVD, DVDRW, High Definition disc/drive, ultra-HD drive, flash memory card or any other storage device. The computing device 400 is able to include one or more network interfaces 402. An example of a network interface includes a network card connected to an Ethernet or other type of LAN. The I/O device(s) 408 are able to include one or more of the following: keyboard, mouse, monitor, screen, printer, modem, touchscreen, button interface and other devices. Emergency contact application(s) 430 used to perform the emergency contact method are likely to be stored in the storage device 412 and memory 404 and processed as applications are typically processed. More or fewer components shown in FIG. 4 are able to be included in the computing device 400. In some embodiments, emergency contact hardware 420 is included. Although the computing device 400 in FIG. 4 includes applications 430 and hardware 420 for the emergency contact method, the emergency contact method is able to be implemented on a computing device in hardware, firmware, software or any combination thereof. For example, in some embodiments, the emergency contact applications 430 are programmed in a memory and executed using a processor. In another example, in some embodiments, the emergency contact hardware 420 is programmed hardware logic including gates specifically designed to implement the emergency contact method.

In some embodiments, the emergency contact application(s) 430 include several applications and/or modules. In some embodiments, modules include one or more sub-modules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, an augmented reality device, a virtual reality device, a home entertainment system, smart jewelry (e.g., smart watch) or any other suitable computing device.

To utilize the emergency contact method and system, a user inputs emergency contact information and/or the information is automatically retrieved and stored. Another person is then able to access the emergency contact information without having to unlock the mobile device storing the information. The person is able to access the information in any manner such as swiping the screen, and the emergency contact information is displayed.

In operation, the emergency contact information available before the lock screen so first responders and/or emergency personnel have access to the information without trying to unlock a phone or scroll through the contact list.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method programmed in a non-transitory memory of a device comprising:
    a. receiving emergency contact information including acquiring an image of an owner of the device by selecting a photo box on the device which causes a camera of the device to be triggered to enable the owner to take a picture of the owner which is displayed in the photobox; and
    b. displaying the emergency contact information on the device without unlocking the device, wherein displaying the emergency contact information includes scanning a code of the device with a camera of a second device which causes the second device to directly send a signal to the device to unlock the device.

2. The method of claim 1 wherein the emergency contact information includes at least one of a name of an owner of the device, an address, a photograph, a scannable item, an emergency contact information, a medical identification number, current medications of the owner of the device, and current health conditions of the owner of the device.

3. The method of claim 1 wherein receiving the emergency contact information includes automatically populating fields on the device by retrieving the information from a second device or from a social networking site.

4. The method of claim 1 wherein receiving the emergency contact information includes receiving a phone number and retrieving corresponding information based on the phone number.

5. The method of claim 1 wherein displaying the emergency contact information includes detecting finger pressure and movement on a screen of the device before displaying the emergency contact information.

6. The method of claim 1 wherein displaying the emergency contact information includes using the camera of the device to read a code on an item to determine if a person is granted access to the emergency contact information.

7. The method of claim 1 wherein displaying the emergency contact information occurs after a physical device containing emergency credentials provided only to a select group of people is inserted into the device.

8. The method of claim 1 further comprising automatically contacting an emergency contact using the emergency contact information, and contacting one or more additional emergency contacts using the emergency contact information in sequential order if a prior call does not result in an answered call.

9. The method of claim 1 further comprising editing the emergency contact information by detecting deletion of a contact from the device and communicating with a medical database to determine changes in medical condition of an owner of the device.

10. The method of claim 1 further comprising implementing a security measure to ensure the emergency contact information is only accessed by emergency or medical personnel.

11. An apparatus comprising:
    a. a non-transitory memory for storing an application, the application for:
        i. receiving emergency contact information including acquiring an image of an owner of the device by selecting a photo box on the device which causes a camera of the device to be triggered to enable the owner to take a picture of the owner which is displayed in the photobox; and
        ii. displaying the emergency contact information on the apparatus without unlocking the apparatus, wherein displaying the emergency contact information includes scanning a code of the device with a camera of a second device which causes the second device to directly send a signal to the device to unlock the device; and
    b. a processing component coupled to the memory, the processing component configured for processing the application.

12. The apparatus of claim 11 wherein displaying the emergency contact information includes using the camera of the apparatus to read a code on an item to determine if a person is granted access to the emergency contact information.

13. The apparatus of claim 11 wherein displaying the emergency contact information occurs after a physical device containing emergency credentials provided only to a select group of people is inserted into the device.

14. The apparatus of claim 11 wherein the application is further for automatically contacting an emergency contact using the emergency contact information, and contacting one or more additional emergency contacts using the emergency contact information in sequential order if a prior call does not result in an answered call.

15. The apparatus of claim 11 wherein the application is further for implementing a security measure to ensure the emergency contact information is only accessed by emergency or medical personnel.

16. A method programmed in a non-transitory memory of a device comprising:
    a. accessing emergency contact information, wherein an image of an owner of the device is acquired by selecting a photo box on the device which causes a camera of the device to be triggered to enable the owner to take a picture of the owner which is displayed in the photobox; and
    b. displaying the emergency contact information on the device without unlocking the device, wherein displaying the emergency contact information includes scanning a code of the device with a camera of a second device which causes the second device to directly send a signal to the device to unlock the device.

17. The method of claim 16 wherein accessing the emergency contact information includes authorizing a user.

18. The method of claim 17 wherein authorizing the user includes: using the camera of the device to read a code on an item to determine if a person is granted access to the emergency contact information, using RFID to determine if the person is granted access to the emergency contact information, using NFC to determine if the person is granted access to the emergency contact information, or using a wireless technology to determine if the person is granted access to the emergency contact information.

19. The method of claim 17 wherein the unlock signal is sent from the second device to the device using an application on the second device which is accessible only by medical or emergency personnel.

\* \* \* \* \*